(12) United States Patent
Komatsu

(10) Patent No.: US 6,930,827 B2
(45) Date of Patent: Aug. 16, 2005

(54) MONOCULAR DEVICE AND BINOCULAR DEVICE

(75) Inventor: Nobuo Komatsu, Suwa (JP)

(73) Assignee: Genesis Technology Co., LTD, Nagano (JP)

( * ) Notice: Subject to any disclaimer, the term of this patent is extended or adjusted under 35 U.S.C. 154(b) by 0 days.

(21) Appl. No.: 10/994,666

(22) Filed: Nov. 23, 2004

(65) Prior Publication Data

US 2005/0141083 A1 Jun. 30, 2005

(30) Foreign Application Priority Data

Dec. 24, 2003 (JP) ............................. 2003-436749

(51) Int. Cl.[7] .............................................. G02B 23/00
(52) U.S. Cl. ...................... 359/363; 359/407; 396/432
(58) Field of Search ............................. 359/381, 399, 359/400, 407–418, 480, 482; 396/432, 351, 396/73–75; 348/42, 50

(56) References Cited

U.S. PATENT DOCUMENTS

| 3,882,521 | A | * | 5/1975 | Johannsen | 396/432 |
| D289,869 | S | * | 5/1987 | Woolley | D14/72 |
| 5,581,399 | A | * | 12/1996 | Abe | 359/410 |
| 5,963,369 | A | * | 10/1999 | Steinthal et al. | 359/410 |
| 6,542,295 | B2 | * | 4/2003 | Boys et al. | 359/410 |
| 2002/0034004 | A1 | * | 3/2002 | Khoshnevis et al. | 359/407 |
| 2004/0125443 | A1 | * | 7/2004 | Nakajima | 359/407 |

FOREIGN PATENT DOCUMENTS

| JP | 11-64740 | 3/1999 |
| JP | 11-112851 | 4/1999 |
| JP | 2003-149560 | 5/2003 |

* cited by examiner

Primary Examiner—Drew A. Dunn
Assistant Examiner—Mark Consilvio
(74) Attorney, Agent, or Firm—Westerman, Hattori, Daniels & Adrian, LLP

(57) ABSTRACT

A binocular device includes two observation optical systems, an additional optical system, and a viewfinder for the additional optical system. An image-capturing unit is movable between a first image-plane position of one of the observation optical systems and an image-plane position of the additional optical system by shifting a lens-switching lever. A switch of the image-capturing unit can be turned on and off by a camera switch lever. For an observation mode using the observation optical system, the image-capturing unit is set at the image-plane position of the additional optical system. For an image-capturing mode using the observation optical system, the image-capturing unit is set at the first image-plane position such that the switch of the image-capturing unit is turned on. For image-capturing using the additional optical system, the image-capturing unit is set at the image-plane position of the additional optical system such that the switch of the image-capturing unit is turned on.

5 Claims, 3 Drawing Sheets

MONOCULAR DEVICE AND BINOCULAR DEVICE

BACKGROUND OF THE INVENTION

1. Field of the Invention

The present invention relates to telescopes, and particularly, to a monocular device and a binocular device which are capable of photographing images by capturing light beams via an observation optical system.

2. Description of the Related Art

There are cases where it is necessary to record images of observation objects, such as landscapes and buildings. To achieve such demands, Japanese Unexamined Patent Application Publication No. 11-64740, Japanese Unexamined Patent Application Publication No. 11-112851, and Japanese Patent Application No. 2001-352506, for example, disclose binocular devices provided with image-recording units.

Such binocular devices having image-recording units are provided with an observation optical system and an image-capturing unit. When the image-capturing unit is positioned at a first image-plane position of the observation optical system, the image-capturing unit captures light beams through the observation optical system. Thus, the image formed by the light beams captured by the image-capturing unit is stored in the image-recording unit.

There are problems, however, in such conventional devices since the images captured are telephotographic, meaning that it is necessary to carry an additional camera for photographing wide-angle images.

SUMMARY OF THE INVENTION

Accordingly, it is an object of the present invention to provide a monocular device and a binocular device provided with an observation optical system and an additional optical system such that the additional optical system can be used for photographing images when the observation optical system is not being used for photographing.

According to a first aspect of the present invention, a monocular device is provided. The monocular device includes an observation optical system having an objective optical member and an ocular optical member; an additional optical system for focusing an image of an object, the additional optical system being independent of the observation optical system; an image-capturing unit; and an optical-system switching unit for an image-capturing operation, the optical-system switching unit moving the image-capturing unit to a first image-plane position corresponding to the observation optical system or to an image-plane position corresponding to the additional optical system. When the observation optical system is used for observation, the image-capturing unit is positioned at the image-plane position of the additional optical system such that the image can be captured using the additional optical system. When the observation optical system is used for image-capturing, the image-capturing unit is positioned at the first image-plane position.

According to a second aspect of the present invention, a binocular device is provided. The binocular device includes a pair of observation optical systems each provided with an objective optical member and an ocular optical member; an additional optical system for focusing an image of an object, the additional optical system being independent of the observation optical system; an image-capturing unit; and an optical-system switching unit for an image-capturing operation, the optical-system switching unit moving the image-capturing unit to a first image-plane position corresponding to one of the observation optical systems or to an image-plane position corresponding to the additional optical system. When the observation optical system is used for observation, the image-capturing unit is positioned at the image-plane position of the additional optical system such that the image can be captured using the additional optical system. When the observation optical system is used for image-capturing, the image-capturing unit is positioned at the first image-plane position.

According to the first aspect of the present invention, if a person desires to simply observe an object, he/she may use the observation optical system, and moreover, if he/she desires to photograph the object through the observation optical system, he/she may shift the image-capturing unit to the first image-plane position of the observation optical system. On the other hand, if he/she desires to photograph at a different angle, he/she may shift the image-capturing unit to the image-plane position of the additional optical system. Accordingly, this means that the monocular device according to the first aspect of the present invention allows photographing of images at multiple angles of view and thus eliminates the need for carrying an additional camera.

Similar to the monocular device of the first aspect, the binocular device according to the second aspect of the present invention is provided with a second observation optical system and allows photographing of images at multiple angles of view. Consequently, like the monocular device of the first aspect, the binocular device of the second aspect eliminates the need for carrying an additional camera.

Furthermore, the binocular device of the second aspect of the present invention may further comprise a viewfinder for the additional optical system, the viewfinder being disposed between the pair of observation optical systems.

Accordingly, since the viewfinder is disposed between the observation optical systems, the binocular device is not increased in size, and moreover, a binocular device with a viewfinder for the additional optical system having no parallax can be provided.

Furthermore, the binocular device of the present invention may further comprise a detachable cover for covering the additional optical system and an objective lens provided in the viewfinder.

Accordingly, foreign matter such as dust and fingerprints are prevented from being attached to the viewfinder and the additional optical system.

Furthermore, the binocular device of the present invention may further comprise a mode-switching unit. The optical-system switching unit may comprise a first movable cover which is capable of covering an ocular lens provided in the viewfinder, the first cover covering the ocular lens when the image-capturing unit is positioned at the first image-plane position. The mode-switching unit may comprise a second movable cover which is capable of covering the ocular lens of the viewfinder, the mode-switching unit being movable such that a switch of the image-capturing unit can be turned on and off. For turning on the switch of the image-capturing unit so as to switch the observation optical system from an observation mode to an image-capturing mode, the optical-system switching unit is moved to a position corresponding to the image-capturing mode of the observation optical system such that the first cover of the optical-system switching unit covers the ocular lens of the viewfinder, or the optical-system switching unit is moved such that the first cover moves the second cover of the mode-switching unit if the ocular lens of the viewfinder is already covered by the second cover when the optical-system switching unit is being moved. For switching the observation optical system from the image-capturing mode to the observation mode, the optical-system switching unit is moved to a position corresponding to the observation mode of the observation optical system or the mode-switching unit is moved to a position corresponding to a switch-off position of the image-capturing unit such that the image-capturing unit is set at the image-plane position of the additional optical system. For image-capturing using the additional optical system, the first cover of the optical-system switching unit or the second cover of the mode-switching unit is moved away from the ocular lens of the viewfinder.

Accordingly, for photographing an image using one of the observation optical systems, it is only necessary to move the optical-system switching unit to a position corresponding to the image-capturing mode of the observation optical system so that a camera switch can be turned on. Moreover, for observing an object using the observation optical system, it is only necessary to move the mode-switching unit to a position corresponding to the observation mode of the observation optical system such that the image-capturing unit is shifted away from the first image-plane position of the observation optical system. Furthermore, for image-capturing using the additional optical system, it is only necessary to move the mode-switching unit to a switch-on position.

Furthermore, since the ocular lens of the additional optical system is covered with the cover when the additional optical system is not being used for image-capturing, the additional optical system is prevented from becoming dirty. Moreover, the cover also prevents a user from looking into the viewfinder and accidentally photographing an image through the additional optical system.

Accordingly, the present invention provides a monocular device and a binocular device used mainly for observation and provided with two image-capturing optical systems having different angles of view.

DESCRIPTION OF THE PREFERRED EMBODIMENTS

A binocular device according to embodiments of the present invention will now be described with reference to the drawings.

Figure 1:
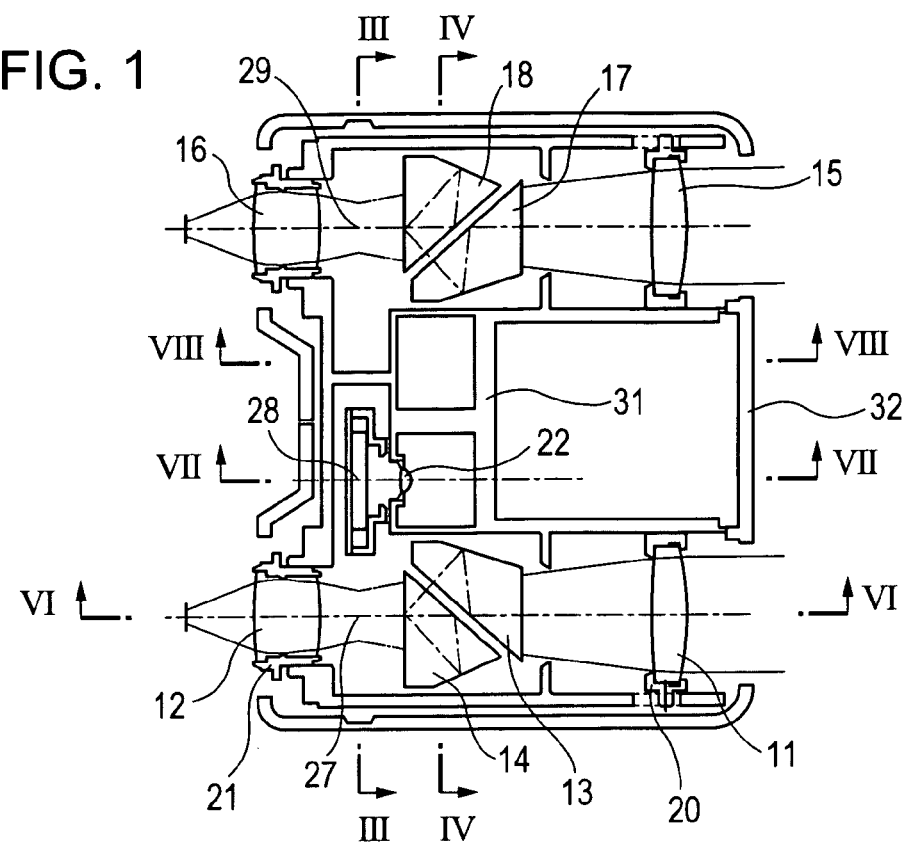
FIG. 1 is a horizontal cross-sectional view of a binocular device according to an embodiment of the present invention, in which a first observation optical system is in an observation state and an additional optical system is in an image-capturing state.
Figure 2:
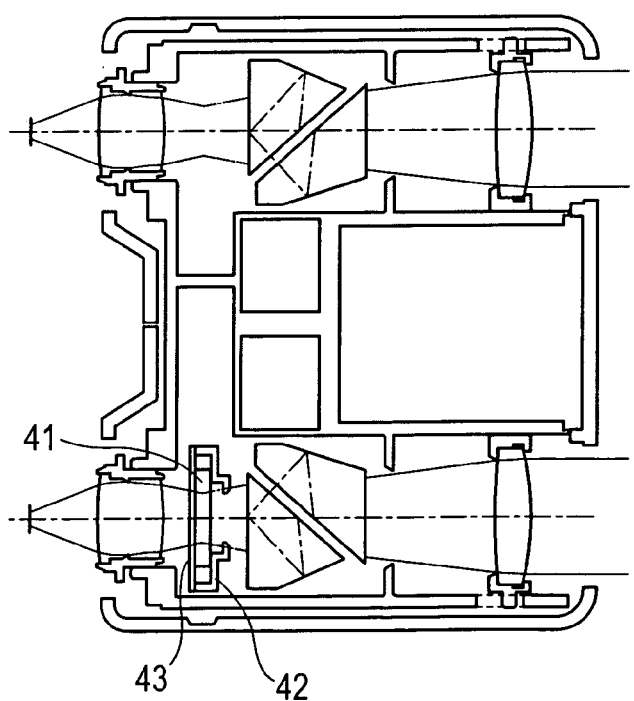
FIG. 2 is a horizontal cross-sectional view of the binocular device according to the embodiment of the present invention, in which the first observation optical system is in the image-capturing state.

FIG. 1 is a horizontal cross-sectional view of a binocular device according to an embodiment of the present invention, in which a first observation optical system is in an observation state and an additional optical system is in an image-capturing state. FIG. 2 is a horizontal cross-sectional view of the binocular device according to the embodiment of the present invention, in which the first observation optical system is in the image-capturing state.

Referring to FIGS. 1 and 2, the binocular device includes the first observation optical system and a second observation optical system. The first observation optical system is provided with an objective lens 11, an ocular lens 12, a first erecting prism 13, and a second erecting prism 14. In detail, an image 27 focused through the objective lens 11 is magnified by the ocular lens 12 such that the image 27 becomes viewable. On the other hand, the second observation optical system is provided with an objective lens 15, an ocular lens 16, a first erecting prism 17, and a second erecting prism 18. Similar to the first observation optical system, an image 29 focused through the objective lens 15 is magnified by the ocular lens 16 such that the image 29 becomes viewable.

The binocular device further includes a casing 31, an objective-lens frame 20, an ocular-lens frame 21, an image-capturing unit 41, an image-capturing-unit frame 42, a substrate 43, a cover 32, and a lens 22 of the additional optical system provided in the binocular device. In FIG. 1, the first observation optical system is in an observation state and the additional optical system is in an image-capturing state. The casing 31 supports the optical systems of the binocular device. The objective-lens frame 20 is supported by the casing 31, and the objective lens 11 is fixed to the objective-lens frame 20 with, for example, an adhesive. Similarly, the ocular-lens frame 21 is supported by the casing 31, and the ocular lens 12 is fixed to the ocular-lens frame 21 with, for example, an adhesive. The image-capturing unit 41 is fixed to the substrate 43 with, for example, solder. Moreover, the substrate 43 is fixed to the image-capturing-unit frame 42 with, for example, screws. The cover 32 covers the entire structure of the binocular device and is fixed to the casing 31 with, for example, screws.

Figure 3:
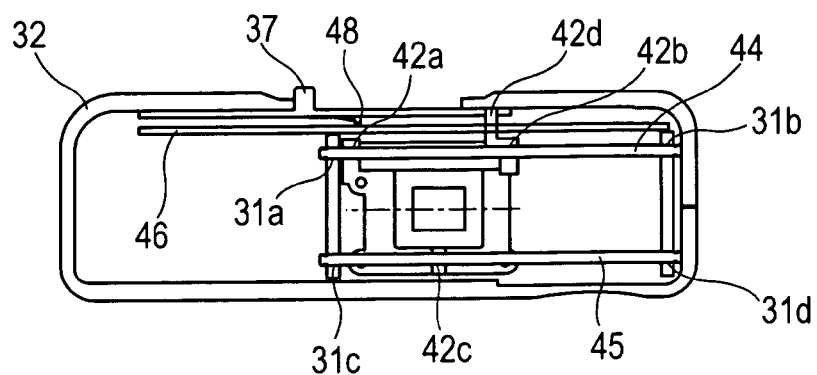
FIG. 3 is a cross-sectional view taken along line III—III in FIG. 1.
Figure 4:
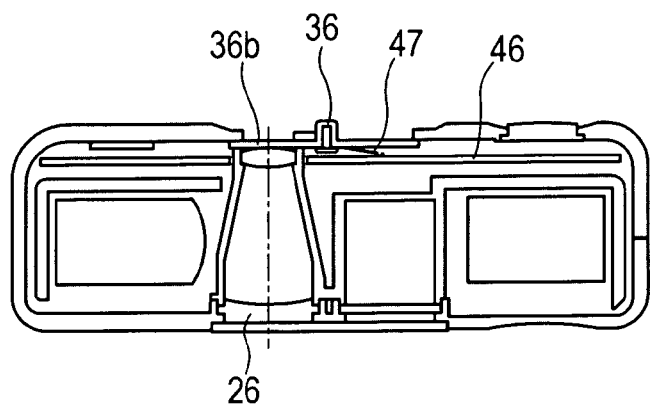
FIG. 4 is a cross-sectional view taken along line IV—IV in FIG. 1.
Figure 5:
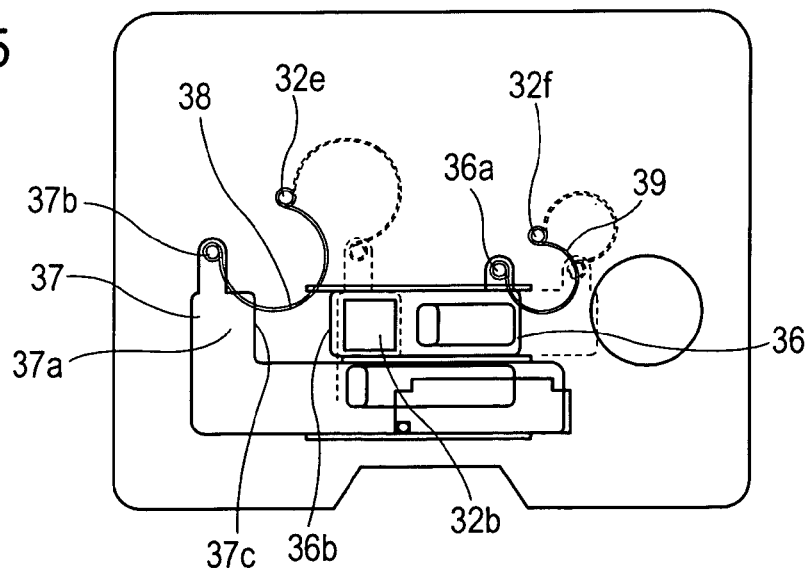
FIG. 5 is a perspective diagram viewed from the top of a cover in FIG. 1.

FIG. 3 is a cross-sectional view taken along line III—III in FIG. 1. FIG. 4 is a cross-sectional view taken along line IV—IV in FIG. 1. FIG. 5 is a perspective diagram viewed from the top of the cover 32 in FIG. 1.

Referring to FIGS. 3, 4, and 5, the binocular device further includes guide shafts 44 and 45 which guide the image-capturing-unit frame 42 holding the image-capturing unit 41. The ends of the guide shaft 44 are fixed to corresponding holes 31a and 31b provided in the casing 31 with, for example, an adhesive, and the ends of the guide shaft 45 are fixed to corresponding holes 31c and 31d provided in the casing 31 with, for example, an adhesive. The image-capturing-unit frame 42 is provided with holes 42a and 42b which are engaged with the guide shaft 44, and is also provided with a hole 42c which is engaged with the guide shaft 45. Specifically, the holes 42a, 42b, and 42c support the image-capturing-unit frame 42 in a movable manner, such that the image-capturing-unit frame 42 is capable of moving in the lateral direction in FIG. 3 between a first image-plane position of the first observation optical system and an image-plane position of the additional optical system. As mentioned previously, the cover 32 covers the entire structure of the binocular device and is fixed to the casing 31 with, for example, screws. The binocular device is further provided with a lens-switching lever 37 which is movable only in the lateral direction in FIG. 3 with respect to, for example, ribs provided on the cover 32. Furthermore, a left segment 37a of the lens-switching lever 37 moves in conjunction with one end 42d of the image-capturing-unit frame 42 so that the image-capturing-unit frame 42 can be shifted between the first image-plane position adjacent to the objective lens 11 of the first observation optical system and the image-plane position adjacent to the lens 22 of the additional optical system.

Accordingly, the lens-switching lever 37, the ribs on the cover 32, the guide shafts 44 and 45, and the image-capturing-unit frame 42, for example, define an optical-system switching unit for an image-capturing operation.

Furthermore, the binocular device is provided with an electric contact 48 fixed to the lens-switching lever 37 with, for example, screws; and a circuit substrate 46. The electric contact 48 is in contact with a pattern on the circuit substrate 46. The electric contact 48 and the pattern on the circuit substrate 46 define a lens switch. The circuit substrate 46 is fixed to the casing 31 with, for example, screws. On the other hand, the binocular device is further provided with a camera switch lever 36 which is movable only in the lateral direction with respect to the ribs on the cover 32. The camera switch lever 36 thus allows switching between an image-capturing mode and an observation mode.

Accordingly, the camera switch lever 36 and the ribs on the cover 32, for example, define a mode-switching unit.

Furthermore, the binocular device is provided with an electric contact 47 which is fixed to the camera switch lever 36 with, for example, screws and is in contact with the pattern on the circuit substrate 46. The electric contact 47 and the pattern on the circuit substrate 46 define a camera switch for activating a camera (the image-capturing unit 41). When the camera switch lever 36 is slid towards the right in FIG. 4, the camera switch is turned on from an off state.

Referring to FIG. 5, the binocular device is further provided with a first horseshoe-shaped spring 38 and a second horseshoe-shaped spring 39. One end of the first spring 38 is attached to a boss 32e provided on the cover 32, and the other end is attached to a boss 37b of the lens-switching lever 37. When the lens-switching lever 37 is moved laterally and reaches an intermediate position, the direction in which a moving force is applied to the lens-switching lever 37 changes. Specifically, if the lens-switching lever 37 is moved towards the right of the intermediate position, the first spring 38 applies force to the lens-switching lever 37 towards the first image-plane position corresponding to the image-capturing mode to be performed by the first observation optical system, whereas if the lens-switching lever 37 is moved towards the left of the intermediate position, the first spring 38 applies force to the lens-switching lever 37 towards the image-plane position corresponding to the image-capturing mode to be performed by the additional optical system. Thus, the image-capturing unit 41 can be positioned at the corresponding image-plane position.

Similar to the first spring 38, one end of the second spring 39 is attached to a boss 32f provided on the cover 32, and the other end is attached to a boss 36a of the camera switch lever 36. When the camera switch lever 36 is moved laterally and reaches an intermediate position, the direction in which a moving force is applied to the camera switch lever 36 changes. Specifically, if the camera switch lever 36 is moved towards the right of the intermediate position, the second spring 39 applies force to the camera switch lever 36 towards the position corresponding to the image-capturing mode, whereas if the camera switch lever 36 is moved towards the left of the intermediate position, the second spring 39 applies force to the camera switch lever 36 towards the position corresponding to the observation mode. Thus, the camera switch can be positioned at an ON position, i.e. the position for the image-capturing mode, or an OFF position, i.e. the position for the observation mode.

Figure 6:
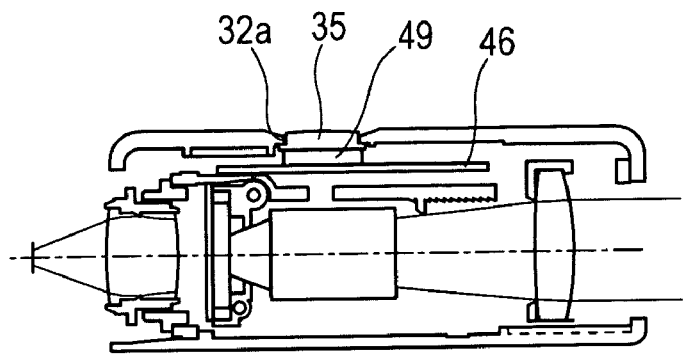
FIG. 6 is a cross-sectional view taken along line VI—VI in FIG. 1.
Figure 7:
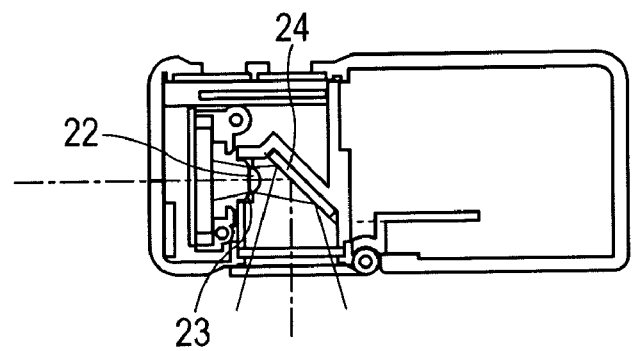
FIG. 7 is a cross-sectional view taken along line VII—VII in FIG. 1.
Figure 8:
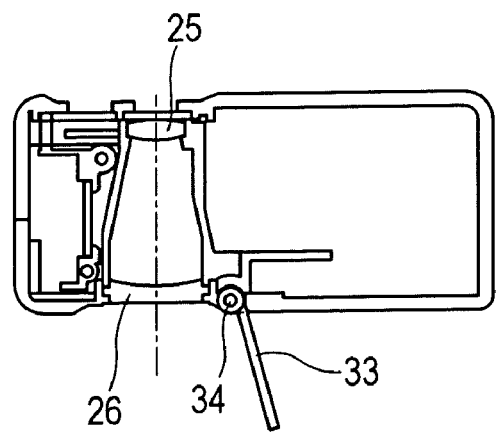
FIG. 8 is a cross-sectional view taken along line VIII—VIII in FIG. 1.

FIG. 6 is a cross-sectional view taken along line VI—VI in FIG. 1. FIG. 7 is a cross-sectional view taken along line VII—VII in FIG. 1. FIG. 8 is a cross-sectional view taken along line VIII—VIII in FIG. 1.

Referring to FIG. 6, a release switch 49 is fixed to the circuit substrate 46 with, for example, solder. Moreover, the cover 32 is provided with a hole 32a through which a release button 35 extends. The hole 32a supports the release button 35 such that the release button 35 is movable in the vertical direction in FIG. 6.

Referring to FIG. 7, the binocular device is further provided with an additional-optical-system frame 23 to which the lens 22 is fixed with, for example, an adhesive. The additional-optical-system frame 23 is fixed to the casing 31 with, for example, screws. A mirror 24 is further provided and is fixed to the casing 31 with, for example, an adhesive. The mirror 24 changes the direction of the optical axis of the lens 22 downward by substantially 90° with respect to the optical axes of the observation optical systems. This means that, with respect to photographing an image using the first observation optical system, the casing 31 has to be turned upward by substantially 90° for photographing an image using the lens 22 of the additional optical system.

Referring to FIG. 8, the additional optical system includes a viewfinder optical subsystem which is provided with an objective lens 26, an ocular lens 25, a viewfinder cover 33, and a viewfinder-cover shaft 34. The objective lens 26 and the ocular lens 25 are fixed to the casing 31 with, for example, an adhesive. The viewfinder cover 33 is pivotally supported by the viewfinder-cover shaft 34 whose two opposite ends are fixed to the casing 31. The viewfinder cover 33 functions as a lid for covering the image-receiving side of the additional optical system, i.e. the objective lens 26.

An operation of the binocular device according to the above embodiment will now be described.

Referring to FIG. 5, in the observation mode, the camera switch lever 36 is positioned at the left side of the binocular device and a left segment 36b of the camera switch lever 36 covers a viewfinder window 32b. Moreover, the lens-switching lever 37 is also positioned at the left side of the binocular device such that the image-capturing-unit frame 42 is positioned adjacent to the additional optical system. Referring to FIG. 1, a light beam transmitted through the objective lens 11 of the first observation optical system passes through the first erecting prism 13 and the second erecting prism 14 so as to form a focused image 27. The ocular lens 12 magnifies the focused image 27 such that the image 27 becomes viewable.

When the camera switch lever 36 is shifted towards the right to switch to the image-capturing mode, the left segment 36b moves right so as to uncover the viewfinder window 32b. Referring to FIG. 1, the image-capturing unit 41 in this state is positioned at a focus position 28 of the additional optical system. When the release button 35 is pressed in this state, the release switch 49 is turned on so that an image of an object is photographed via an image memory circuit (not shown in the drawings) and is stored in memory (not shown in the drawings).

In this state, if the lens-switching lever 37 is shifted towards the right to a position corresponding to the image-capturing mode to be performed by the first observation optical system, the image-capturing unit 41 is shifted to the first image-plane position so as to capture the image 27 of an object. If the release button 35 is pressed in this state, the release switch 49 is turned on so that the image 27 is photographed via an image memory circuit (not shown in the drawings) and is stored in memory (not shown in the drawings). In this case, the left segment 37a of the lens-switching lever 37 covers the viewfinder window 32b so that an image is prevented from being photographed accidentally via the additional optical system.

In this state, when the lens-switching lever 37 is shifted towards the left, i.e. towards the additional optical system, the left segment 37a of the lens-switching lever 37 uncovers the viewfinder window 32b and the image-capturing unit 41 moves to a position adjacent to the additional optical system so that photographing can be performed using the additional optical system.

On the other hand, when the camera switch lever 36 is shifted towards the left so as to switch from the image-capturing mode of the first observation optical system to the observation mode of the first observation optical system, the left segment 36b of the camera switch lever 36 presses against an edge 37c of the lens-switching lever 37. Consequently, the first spring 38 forces the lens-switching lever 37 to move to the position corresponding to the additional optical system, and moreover, the image-capturing unit 41 moves from the first image-plane position of the first observation optical system to the image-plane position of the additional optical system, as shown in FIG. 5.

When the lens-switching lever 37 is shifted towards the right to the position corresponding to the image-capturing mode of the first observation optical system from the state in FIG. 5, i.e. the state in which the camera switch lever 36 is at the position corresponding to the observation mode and the lens-switching lever 37 is at the image-plane position of the additional optical system, the edge 37c of the lens-switching lever 37 presses against the left segment 36b of the camera switch lever 36. Consequently, the second spring 39 forces the camera switch lever 36 to move to the position corresponding to the image-capturing mode. The binocular device is thus in the image-capturing mode of the first observation optical system.

Although a binocular device is described in the above embodiment, a monocular device can be alternatively provided by excluding the second observation optical system.

Furthermore, although the optical path in the additional optical system according to the above embodiment is provided with a mirror as a wide-angle lens, a prism may alternatively be used in place of the mirror. Moreover, the optical axis of the additional optical system does not necessarily have to be perpendicular to the optical axes of the observation optical systems as in the above embodiment. For example, the optical axis of the additional optical system may alternatively be parallel to the optical axes of the observation optical systems.

Furthermore, although the binocular device according to the present invention is provided with a mechanism for changing the distance between the first and second observation optical systems, the description of the structure of such a mechanism is omitted. Moreover, a focusing mechanism is also provided in the binocular device according to the present invention but the description of its structure is also omitted since such a mechanism can be readily provided by using a conventional focusing mechanism.

What is claimed is:

1. A monocular device comprising:
an observation optical system including an objective optical member and an ocular optical member;
an additional optical system for focusing an image of an object, the additional optical system being independent of the observation optical system;
an image-capturing unit; and
an optical-system switching unit for an image-capturing operation, the optical-system switching unit moving the image-capturing unit to a first image-plane position corresponding to the observation optical system or to an image-plane position corresponding to the additional optical system, wherein
when the observation optical system is used for observation, the image-capturing unit is positioned at the image-plane position of the additional optical system such that the image can be captured using the additional optical system, and
when the observation optical system is used for image-capturing, the image-capturing unit is positioned at the first image-plane position.

2. A binocular device comprising:
a pair of observation optical systems each provided with an objective optical member and an ocular optical member;
an additional optical system for focusing an image of an object, the additional optical system being independent of the observation optical system;
an image-capturing unit; and
an optical-system switching unit for an image-capturing operation, the optical-system switching unit moving the image-capturing unit to a first image-plane position corresponding to one of the observation optical systems or to an image-plane position corresponding to the additional optical system, wherein
when said one of the observation optical systems is used for observation, the image-capturing unit is positioned at the image-plane position of the additional optical system such that the image can be captured using the additional optical system, and
when said one of the observation optical systems is used for image-capturing, the image-capturing unit is positioned at the first image-plane position.

3. The binocular device according to claim 2, further comprising a viewfinder for the additional optical system, the viewfinder being disposed between the pair of observation optical systems.

4. The binocular device according to claim 3, further comprising a detachable cover for covering the additional optical system and an objective lens provided in the viewfinder.

5. The binocular device according to one of claims 3 and 4, further comprising a mode-switching unit, wherein
the optical-system switching unit comprises a first movable cover which is capable of covering an ocular lens provided in the viewfinder, the first cover covering the ocular lens when the image-capturing unit is positioned at the first image-plane position,
the mode-switching unit comprises a second movable cover which is capable of covering the ocular lens of the viewfinder, the mode-switching unit being movable such that a switch of the image-capturing unit can be turned on and off,
for turning on the switch of the image-capturing unit so as to switch said one of the observation optical systems from an observation mode to an image-capturing mode, the optical-system switching unit is moved to a position corresponding to the image-capturing mode of said observation optical system such that the first cover of the optical-system switching unit covers the ocular lens of the viewfinder, or the optical-system switching unit is moved such that the first cover moves the second cover of the mode-switching unit if the ocular lens of the viewfinder is already covered by the second cover when the optical-system switching unit is being moved, for switching said observation optical system from the image-capturing mode to the observation mode, the optical-system switching unit is moved to a position corresponding to the observation mode of said observation optical system or the mode-switching unit is moved to a position corresponding to a switch-off position of the image-capturing unit such that the image-capturing unit is set at the image-plane position of the additional optical system, and for image-capturing using the additional optical system, the first cover of the optical-system switching unit or the second cover of the mode-switching unit is moved away from the ocular lens of the viewfinder.

\* \* \* \* \*